United States Patent [19]

Bennis et al.

[11] Patent Number: 5,159,774
[45] Date of Patent: Nov. 3, 1992

[54] MARKER FOR FISHING RIG

[75] Inventors: Gary L. Bennis, Eau Claire; Anthony M. Burlingame, Black River Falls, both of Wis.

[73] Assignee: Gary Bennis, Eau Claire, Wis.

[21] Appl. No.: 822,748

[22] Filed: Jan. 21, 1992

[51] Int. Cl.$^5$ ............................................. A01K 75/02
[52] U.S. Cl. ......................................... 43/17.5; 43/17; 24/339
[58] Field of Search ............... 43/17, 17.5, 25, 17.6; 24/339, 545

[56] References Cited

U.S. PATENT DOCUMENTS

| | | | |
|---|---|---|---|
| 351,941 | 11/1886 | Simmons . | |
| 1,992,874 | 2/1935 | McDowell | 43/17 |
| 2,191,782 | 2/1940 | Valane | 248/229 |
| 2,770,907 | 11/1956 | Sharer | 43/17 |
| 2,885,817 | 5/1959 | Carter | 43/25 |
| 3,032,603 | 5/1962 | Whitley | 24/339 |
| 3,063,185 | 11/1962 | Dinger | 43/17 |
| 3,250,036 | 5/1966 | Wenger | 43/17 |
| 3,846,930 | 11/1974 | Brown | 43/25 |
| 3,918,191 | 11/1975 | Williamson | 43/17 |
| 3,921,328 | 11/1975 | Holcombe | 43/17.6 |
| 4,002,349 | 1/1977 | Dopp | 24/339 |
| 4,407,472 | 10/1983 | Beck . | |
| 4,505,063 | 3/1985 | Price . | |
| 4,519,158 | 5/1985 | Kirk et al. . | |
| 4,528,554 | 7/1985 | Klefbeck | 43/17 |
| 4,617,775 | 10/1986 | Padrun | 24/545 |
| 4,709,500 | 12/1987 | Yasumiishi . | |
| 4,730,409 | 3/1988 | Mitchell . | |
| 4,800,670 | 1/1989 | Mattison | 43/17.6 |
| 4,823,496 | 4/1989 | Powell . | |
| 4,907,363 | 3/1990 | Dury | 43/17 |

Primary Examiner—Richard K. Seidel
Assistant Examiner—Chuck Y. Mah
Attorney, Agent, or Firm—Jacobson & Johnson

[57] ABSTRACT

A lightweight, resilient, flexible, one piece holding device formed by a pair of cylindrical, co-extensive resilient tubes, one for resiliently holding a chemiluminescence capsule, and the other for dynamically attaching the holding device to a fishing rig to enable a user to fish in low-light conditions without impeding the dynamic action of the fishing rig.

10 Claims, 3 Drawing Sheets

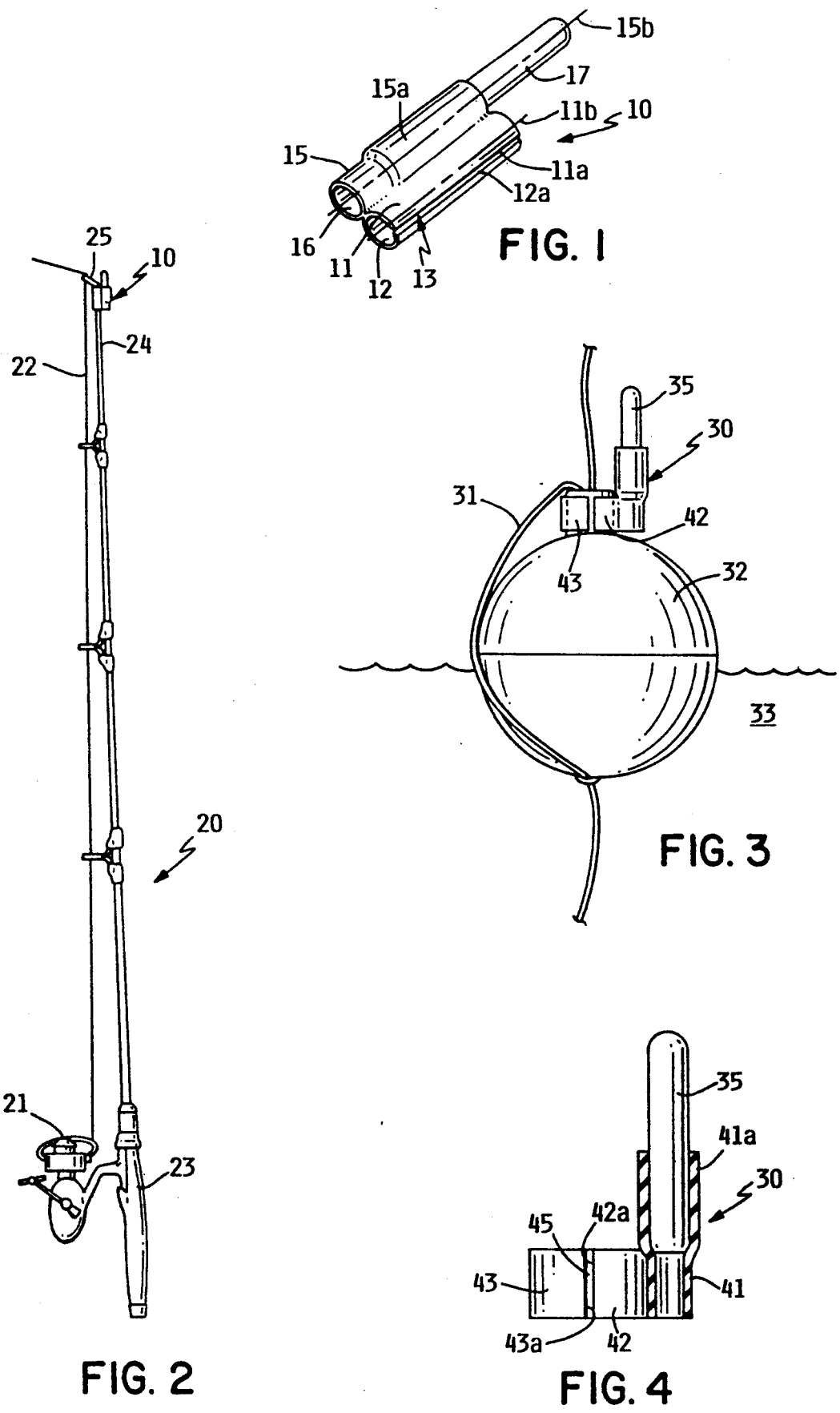

MARKER FOR FISHING RIG

This invention relates generally to luminous markers, and more specifically, chemiluminescence markers that can be mounted on a fishing rigs such as bobbers or fishing rods to provide a night-time visual indication of the motion or location of the bobber or the fishing rod.

BACKGROUND OF THE INVENTION

The concept of night fishing and the use of illuminating devices or markers for night fishing and low light fishing is old in the art. Typically, when one is fishing at night, seeing the line or the bobber is difficult. Consequently, some type of a fluorescent material or light is attached to the rod tip or the bobber to provide a visual indication of the position of the bobber or fishing rod. One of the difficulties with the prior art devices is that some of the devices operate only if reflected light shines on the unit, and others are bulky and cumbersome to use. Still others require bulky batteries to power a light bulb.

The present invention comprises an improved, lightweight chemiluminescence marker comprising a one piece, flexible, lightweight holding device and a disposable chemiluminescence capsule for temporary attachment to a fishing rig such as fishing rod, fishing bobber or the like that enables a user to replace the chemiluminescence capsule once the light energy in the chemiluminescence capsule is spent. The lightweight marker provides a dynamic illumination marker that can be used on sensitive fishing rigs such as fishing bobbers.

DESCRIPTION OF THE PRIOR ART

U.S. Pat. No. 4,823,496 shows a resilient, luminous fishing rod clip which has the shape of a hairpin. The clip has a U-shaped section that attaches to the end of a fishing rod. The clip relies on reflected light to indicate the movement of the fishing rod.

U.S. Pat. No. 4,505,063 shows a night-fishing-signal device which comprises a container with bulbous end and a chemiluminescence liquid in the container. In operation, the inner container is broken so that the reactants can mix and produce light through a chemiluminescence reaction. The bulbous end of the container extends in a direction perpendicular from the fishing rod. If a fish bites, the tip of the rod moves up and down to indicate to the user a fish is on the line.

U.S. Pat. No. 4,709,500 shows an attachment for the end of a fishing rod comprising a tubular member with a flag projecting outward from the tubular member. The member is made of a fluorescent, polyvinyl plastic to draw the user's attention to any movement of the rod and the attachment.

U.S. Pat. No. 4,730,409 shows a multi-purpose fishing rod attachment for clipping onto a rod. The attachment includes a tubular member that attaches to the rod with a line cutter located on the attachment.

U.S. Pat. No. 4,519,158 shows a fishing line activity indicator which includes contacts to turn on a light when the fishing rod is bent.

U.S. Pat. No. 4,407,472 shows a hose handling keeper which has two cylindrical sleeves which are open on both ends and along a longitudinal axis to facilitate the coiling, storage and handling of noncollapsible, flexible hoses.

U.S. Pat. No. 4,002,349 shows a ski clip device which has two longitudinally slit cylindrical tubes located in the parallel relationship. One tube attaches to the skis and the other tube attaches to the ski poles to hold the ski poles proximate the skis.

U.S. Pat. No. 3,250,036 shows a line holding a signal attachment for a fishing rod that includes a contact arm that completes a circuit to turn a light on when the line pulled on by a fish.

U.S. Pat. No. 3,063,185 shows another embodiment of a line operated signaling device using a lever arm to activate a light mounted on the fishing rod.

U.S. Pat. No. 2,770,907 shows a fishing pole signal attachment that uses a luminous member having wire ends that can be attached to the fishing rod in order to call the user's attention to any movement of the fishing rod.

U.S. Pat. No. 351,941 shows a member for holding fur boas which has parallel clips, one next to the other.

U.S. Pat. No. 2,191,782 shows a thermometer holder for putting on a bedpost to hold a thermometer.

BRIEF SUMMARY OF THE INVENTION

Briefly, the invention comprises a lightweight, resilient, flexible, one piece holding device formed by a pair of cylindrical, co-extensive resilient tubes, one for resiliently holding a chemiluminescence capsule, and the other for dynamically mounting the holding device on a fishing rig.

BRIEF DESCRIPTION OF THE DRAWINGS

FIG. 1 shows a perspective view of the invention holding a chemiluminescence capsule.

FIG. 2 shows a fishing rod with chemiluminescence capsule attached to the end portion of the fishing rod.

FIG. 3 shows a fishing bobber with our marker attached to the stem of the bobber.

FIG. 4 shows a partial sectional view of the bobber of FIG. 3.

DESCRIPTION OF THE PREFERRED EMBODIMENT

Figure 5:
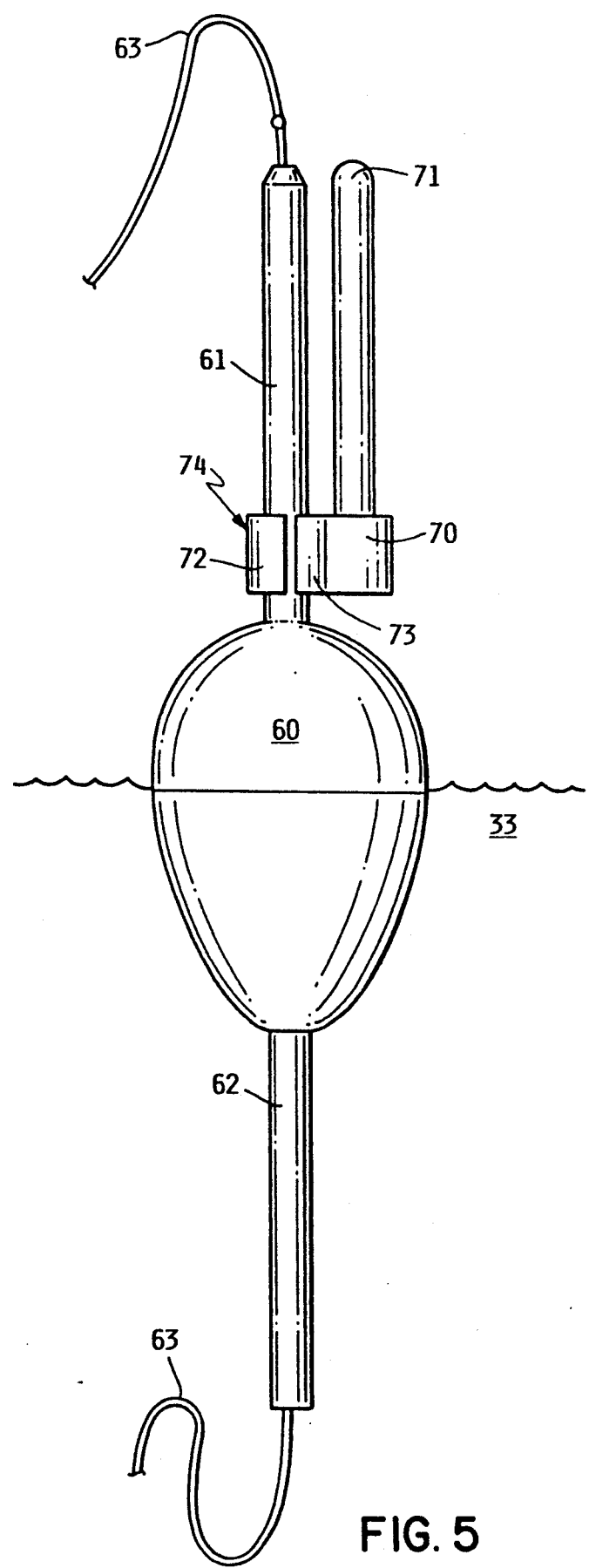
FIG. 5 shows an alternate embodiment of fishing bobber with our marker attached to the stem of the bobber.

Referring to FIG. 1, reference numeral 10, generally identifies a lightweight, portable device for attaching to a fishing rig. Device 10 comprises a first resilient tube 11 having an interior surface 12 and a slot 13 extending longitudinally along the length of the tube. Tube 11 is made of a resilient material, such as rubber or the like. Located coextensive and secured in a longitudinal manner thereto is a second cylindrical resilient tube 15 having an inner surface 16. Located in frictional engagement with the interior surface 16 is a chemiluminescence capsule 17 which extends into member 15a as evidenced by the distended portion 15a.

Referring to FIG. 2, our invention 10 is shown temporarily located on fishing rig such as fishing rod 20 having a handle 23 and a reel 21. The invention is located at tip portion 24 of rod 20.

Referring to FIG. 3, reference numeral 30, identifies an alternate embodiment of the invention which is attached to a spherical fishing float 32. A fishing line 31 extends from above water 33 to below water 33 and to a weighted sinker (not shown). Located on the stem on the top of the bobber is fishing marker 30 which is shown in greater detail in FIG. 4.

FIG. 4 shows a chemiluminescence capsule 35 resiliently mounted in distended portion 41a through frictional forces produced by the resilient tube 41. Located partially co-extensive with tube 41 is a second larger tube 42 which has a slot 45 therein and a fist lip 42a and a second lip 43a for placing around a portion of a fishing rig such as the stem of fishing bobber 32.

FIG. 5 shows an alternate embodiment with a chemiluminescence capsule 71 resiliently mounted in member 70 of resilient tube 74 through frictional forces produced by a resilient tube 74. Located co-extensive with tube 70 is a second tube which has a fist resilient lip 72 and a second resilient lip 73 for placing around a top portion of body 61 of elongated fishing bobber 60. The chemiluminescence capsule 71 extends parallel to the vertical axis of fishing bobber 60 with the top of the chemiluminescence capsule 71 being at approximately the same height as the top of bobber 60 so that the chemiluminescence light is visible to a viewer fishing in the dark or under low light conditions.

Figure 6:
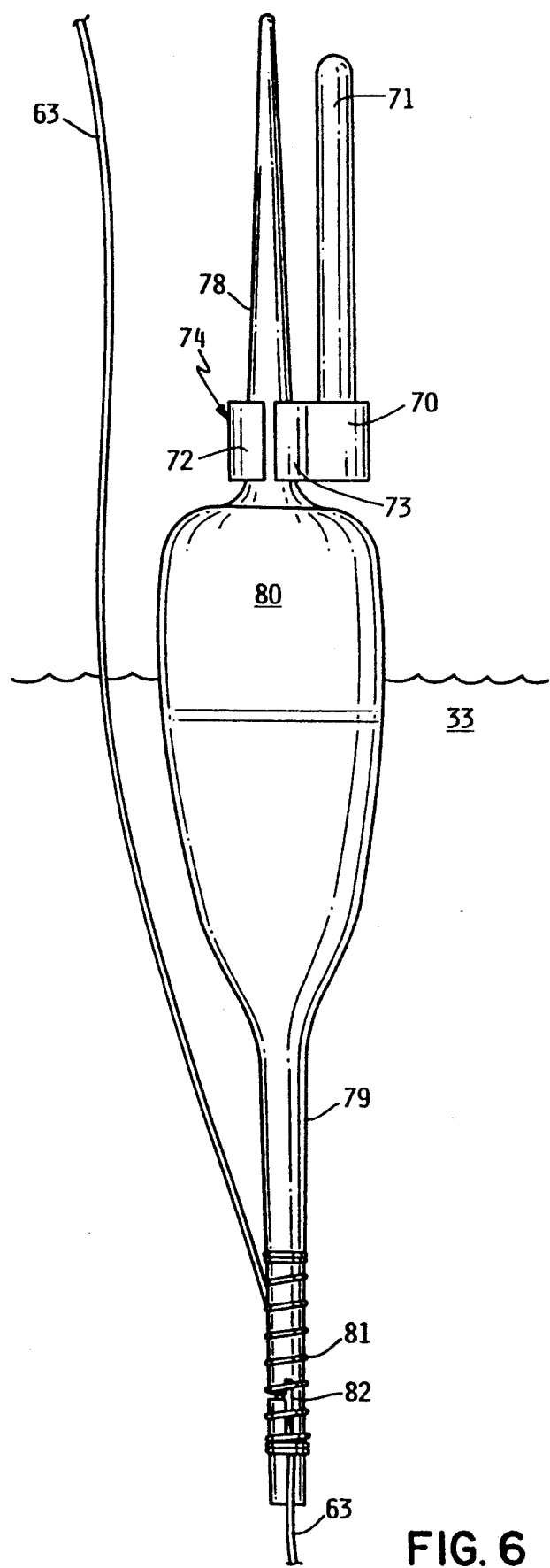
FIG. 6 shows a further alternate embodiment of fishing bobber with our marker attached to the stem of a stick bobber.

FIG. 6 shows a further alternate embodiment with a chemiluminescence capsule 71 resiliently mounted in member 70 of resilient tube 70 through frictional forces produced by resilient tube 70. It should be pointed out that like parts in the drawings contain identical numbers. Located coextensive with tube 70 is second tube 74 which has fist resilient lip 72 and second resilient lip 73 for placing around a portion of top stem 78 of stick bobber 80. The chemiluminescence capsule 71 extends parallel to the vertical axis of fishing bobber 80 with the top of the chemiluminescence capsule 71 being at approximately the same height as the top of stem 78 of stick bobber 80 so that the chemiluminescence light is visible to a viewer fishing in the dark or under low light conditions. Line 63 extends under a spring 81 and through a slot 82 in lower stem 79 of bobber 80.

More specifically, our invention comprises a lightweight device for temporary, dynamic, attachment to a fishing rig such as a fishing pole or fishing bobber to enable a user to quickly and temporarily mount a chemiluminescence light stick therein. Chemiluminescence capsule are known in the art and are commercially available in a cylindrical, closed end capsule that contains a crushable internal ampule. One such chemiluminescence capsule is sold under the Trademark CYALUME (Registered Trademark of American Cyanamid Company) Chemiluminescence capsule are described in more detail in U.S. Pat. Nos. 3,597,362 and 3,539,794. When the internal ampule is crushed the chemicals in the chemiluminescence capsule mix and emit light for several hours. The light generated is achieved without the aid of batteries and bulbs and solely within the confines of a closed capsule making it suitable for use in fishing rigs since the chemiluminescence materials are sealed within the capsule and will not pollute the fishing waters or provide a scent that might scare a fish away.

The holding device 10 includes a first, resilient, cylindrical member 11 having a central axis 11b and an elongated opening 13 extending substantially parallel to axis 11b. The first cylindrical member 11 has an interior frictional surface 12 for frictionally engaging at least a portion of a fishing rig. Located on the outside of the first cylindrical member 11 is an exterior surface with a first resilient lip 11a located proximate one side of elongated opening 13 and a second resilient lip 12a located proximate the other side of elongated opening 13. The first cylindrical member 11 is made from a resilient material to permit the flexing of first lip 11a and second lip 12a to permit a user to bend and flex the cylindrical member so that a user can temporarily attach the first cylindrical member 11 to a portion of a fishing rig through placement of the interior surface of the cylindrical member into contact around a portion of a fishing rig such as a fishing pole 24 or a fishing bobber 32. The resiliency of the first cylindrical member holds the interior frictional surface 12 in a fixed position on the portion of the fishing rig so that when the fishing rig is moved it causes first cylindrical member 11 to move in response to movement of the fishing rig. The cylindrical members are sufficiently light in relationship to the fishing rod tip or the fishing bobber so that the dynamic action of the bobber or the fishing rig is not impeded by the inertia or the weight of the holder and the chemiluminescence capsule.

Located adjacent to the first resilient, cylindrical member 11 is a second resilient, cylindrical member 15. The second cylindrical member 15 is located substantially coextensive with the first cylindrical member 11 with an exterior portion of cylindrical member 15 secured to a similar exterior portion of first cylindrical member 11. The attachment of the first cylindrical member 11 to the second cylindrical member 15 causes the movement of the fishing rig and the first cylindrical member 11 attached thereto to be transferred to second cylindrical member 15. The second cylindrical member 15 which is formed of a resilient material has an interior frictional surface for frictionally engaging and holding a portion of a chemiluminescence capsule containing a crushable ampule for mixing the chemicals in the chemiluminescence capsule.

FIG. 4 shows the chemiluminescence capsule 35 secured to member 41 and projecting outward from distended portion 41a of resilient member 41. The chemiluminescence capsule projects sufficiently far from the holding device so as to permit a person to follow the movement of the fishing rig during conditions of low light. The amount of the capsule that projects outward from the device can be determined by the fisherperson. If only a small amount of light is needed the capsule can be inserted sufficiently far into the member 41 so as to obscure a significant portion of the emitted light. On the other hand if more light is desired the capsule can be extended further out of device 30. In addition if desired the resilient cylindrical members can be made of a translucent material to permit the light from the chemiluminescence capsule to not only be emitted out of the capsule but also through the sides of the holding device that are securing the chemiluminescence capsule 35 to the holding device.

In operation of our invention first cylindrical member 11 and second cylindrical member 15 dynamically attach to a fishing rig so that chemiluminescence capsule 17 can emit sufficient light so that a person fishing in low light conditions can readily detect the motion of the fishing rig by observing the motion of the illuminated chemiluminescence capsule 17. mounted on the fishing rig. By having the holding device lightweight and of one piece construction one can mount the holding device and chemiluminescence capsule directly on a fishing bobber without impairing the action of the bobber. In addition the lightweight of the holding device does not interfere with the feel of the line as a person reels in the fishing line.

We claim:

1. A one piece device for temporary attachment to a fishing rig to enable a user to temporarily mount a chemiluminescence capsule thereon without impairing the action of the fishing rig comprising:

a first cylindrical member having a central axis and an opening extending substantially parallel to said axis, said first cylindrical member having an interior frictional surface for frictionally engaging at least a portion of a fishing rig, said first cylindrical member having an exterior surface, said cylindrical member including a first flexible lip located proximate said opening and a second flexible lip located proximate said opening, said first cylindrical member made from a resilient material, said resilient material holding said first flexible lip and said second flexible lip to the portion of the fishing rig when the interior frictional surface of the cylindrical member is located around the portion of a fishing rig, said first flexible lip and said second flexible lip flexible outward from said axis to allow removal of said first cylindrical member from the portion of the fishing rig, the resiliency of said first cylindrical member sufficient to hold the interior frictional surface in fixed position on the portion of the fishing rig during movement of the fishing rig so that the movement of the fishing rig causes said first cylindrical member to move in response to movement of the fishing rig;

an elongated cylindrical chemiluminescence capsule for providing illumination under low light conditions;

a second cylindrical member, said second cylindrical member connected to said first cylindrical member, said second cylindrical member having an exterior portion with said exterior portion of said second cylindrical portion secured to said exterior portion of said first cylindrical surface so that movement of said first cylindrical member is transferred to said second cylindrical member, said second cylindrical member formed of a resilient material and having an interior frictional surface for frictionally engaging and frictionally holding a portion of the chemiluminescence capsule therein to permit the chemiluminescence capsule to project outward from said second cylindrical member sufficiently far so as to permit a person to follow the movement of the fishing rig during darkness or low light conditions, said first cylindrical member, said second cylindrical member and said chemiluminescence capsule sufficiently lightweight in relation to said fishing rig so that the one piece device and chemiluminescence capsule do not impede the normal fishing motions of the fishing rig so that a person fishing in darkness or low light conditions can readily detect the motion of the fishing rig by observing the motion of the illuminated chemiluminescence capsule mounted on the fishing rig.

2. The device of claim 1 wherein the fishing rig is a fishing bobber.

3. The device of claim 1 wherein the fishing rig is a fishing pole.

4. The device of claim 2 wherein said device and said chemiluminescence capsule are sufficiently light so that the weigh of the device and the chemiluminescence capsule are less than the buoyant forces generated by said fishing bobber to permit mounting of said device and said chemiluminescence capsule on said fishing bobber to thereby provide a visual indication of the movement of the fishing bobber under low light conditions.

5. The device of claim 1 wherein said device is made of rubber.

6. The device of claim 1 wherein said device is one piece unitary construction.

7. The device of claim 1 wherein said second cylindrical member comprises a closed tube that is radially distensible around the chemiluminescence capsule.

8. The device of claim 1 wherein said device is translucent.

9. The device of claim 1 wherein said first cylindrical member and said second cylindrical member are of substantially the same length.

10. A one piece lightweight device for temporary attachment to a fishing rig to enable a user to temporarily mount a disposable chemiluminescence capsule therein comprising:

a first resilient member having integral means for frictionally engaging at least a portion of a fishing rig, said integral means on said first resilient member operable to permit a user to temporarily attach said first resilient member to the portion of a fishing rig through placement of the first resilient member around the portion of a fishing rig and then engaging the portion of the fishing rig with said integral means;

a second resilient member, said second resilient member located adjacent to and connected to said first resilient member, said second resilient member having an interior frictional surface for frictionally engaging and holding a portion of a chemiluminescence capsule containing an activateable chemiluminescence material therein, said chemiluminescence capsule projecting outward from said second resilient member sufficiently far so as to permit a person to follow the movement of the fishing rig during conditions of darkness or low light, said first member, said second resilient member and said chemiluminescence capsule sufficiently lightweight in relation to the fishing rig so as to permit attachment of said device and said chemiluminescence capsule to the fishing rig to enable a person to fish in darkness or low light conditions while readily allowing the user to detect the normal motion of the fishing rig by observing the motion of the chemiluminescence capsule mounted in the device.

* * * * *